United States Patent [19]

Harrison

[11] Patent Number: 4,771,869
[45] Date of Patent: Sep. 20, 1988

[54] BRAKE ADJUSTERS

[75] Inventor: Anthony W. Harrison, Selly Oak, England

[73] Assignee: Lucas Industries Public Limited Company, Birmingham, England

[21] Appl. No.: 936,441

[22] Filed: Dec. 1, 1986

[30] Foreign Application Priority Data

Dec. 3, 1985 [GB] United Kingdom ............... 8529720

[51] Int. Cl.$^4$ ............................................. F16D 55/02
[52] U.S. Cl. .................................. 188/71.9; 188/170; 188/203
[58] Field of Search ............... 188/71.8, 71.9, 79.5 R, 188/196 A, 196 C, 196 D, 196 P, 196 BA, 196 R, 170, 203

[56] References Cited

U.S. PATENT DOCUMENTS

| | | | |
|---|---|---|---|
| 3,043,406 | 7/1962 | Larsson | 188/203 |
| 3,401,775 | 9/1968 | Sobol et al. | 188/203 |
| 3,592,299 | 7/1971 | Erdmann | 188/71.9 |
| 3,593,827 | 7/1971 | Sander | 188/203 |
| 3,815,471 | 6/1974 | Kobelt | 188/196 A |
| 3,899,053 | 8/1975 | Nadas | 188/203 |
| 4,005,767 | 2/1977 | Farello | 188/203 |
| 4,472,995 | 9/1984 | Persson | 188/170 |
| 4,544,047 | 10/1985 | Clemmons et al. | 188/170 |

Primary Examiner—Andres Kashnikow
Assistant Examiner—Mark T. Le
Attorney, Agent, or Firm—Scrivener and Clarke

[57] ABSTRACT

The present specification discloses a brake actuator incorporating a mechanically operated adjuster, the adjuster compensating for friction pad wear. The brake actuator comprises two adjuster members interconnected by a self-sustaining thread and located between a friction pad and an actuation member, the actuation member being biassed by a main spring to a brakes-on position with at least one hollow piston being displaceable under hydraulic pressure to compress the main spring and move the actuation member to a brakes-off positon, a second piston being carried within the hollow piston and being carried within the hollow piston and being axially displaceable therein under the hydraulic pressure and against a further spring, to cause interengaging clutch elements to rotate one adjuster member relative to the other adjuster member, a stop being arranged to limit the available movement of the clutch elements. The present invention thus provides a mechanically operated adjuster which avoids the inherent disadvantages of hydraulic operation.

6 Claims, 1 Drawing Sheet

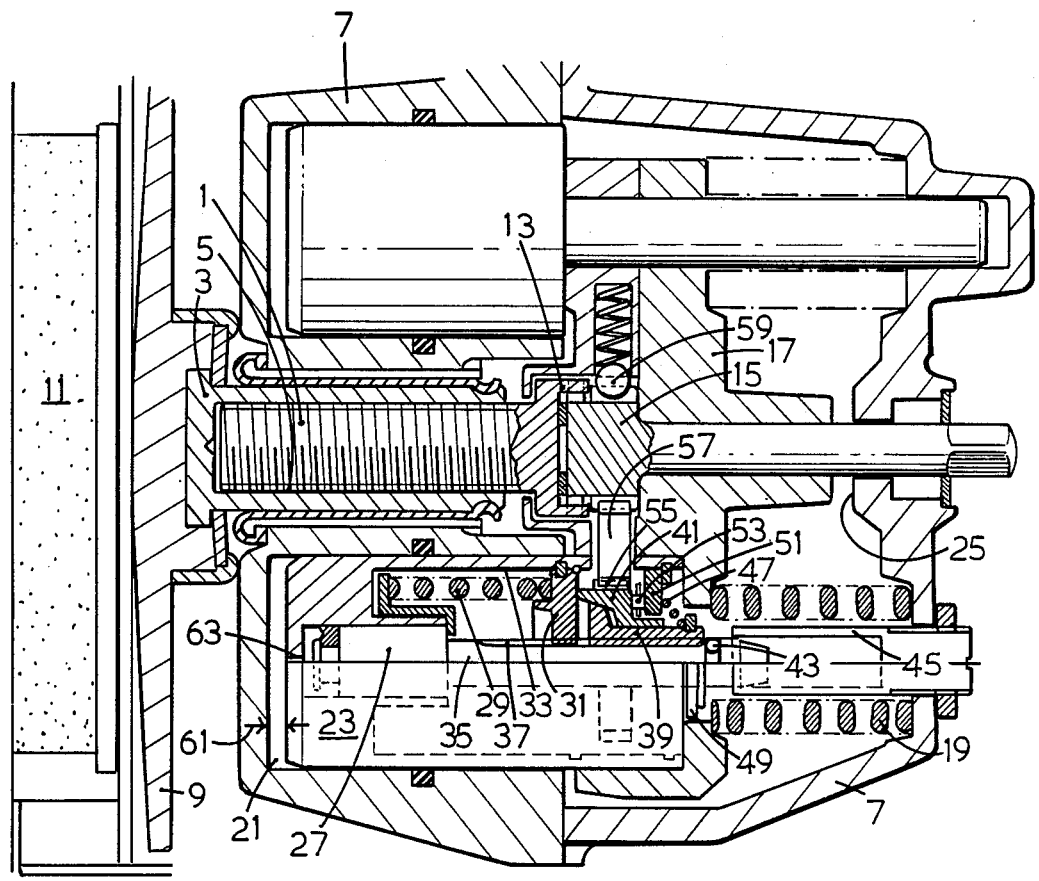

BRAKE ADJUSTERS

DESCRIPTION

The present invention relates to a brake actuator incorporating an automatic adjuster.

In particular the present invention relates to a brake actuator incorporating a mechanically operated adjuster, the adjuster compensating for friction pad wear. Certain known adjusters are hydraulically operated and due to there being possible problems with hydraulic operation, e.g. seal failure, which are especially disadvantageous in certain applications, the use of a hydraulically operated adjuster is not fully approved.

The aim of the present invention is to provide an automatic adjuster which is mechanically operated and which thus avoids the inherent disadvantages of hydraulic operation.

According to the present invention there is provided a brake actuator comprising two adjuster members interconnected by a self-sustaining thread and located between a friction pad and an actuation member, the actuation member being biassed by a main spring to a brakes-on position with at least one hollow piston being displaceable under hydraulic pressure to compress the main spring and move the actuation member to a brakes-off position, a second piston being axially displaceable within said hollow piston under said hydraulic pressure and against a further spring, to cause interengaging means to rotate one adjuster member relative to the other adjuster member, stop means being arranged to limit the available movement of said interengaging means.

In a preferred embodiment of the present invention the interengaging means comprises a cone clutch, a first part of which is mounted on a spiral thread on an elongate axial extension of said second piston, said second piston being preferably non-rotatable, and a second part of which is spring mounted coaxially with said axial extension and meshed with a gear which can rotate said one adjuster member. Said stop means preferably comprises a stud projecting laterally from said axial extension between adjacent threads, thus limiting the available rotation of said first cone clutch part on said axial extension, and a sleeve coaxially mounted with said axial extension. Said axial extension thus moves coaxially within said sleeve as the brake is released, said sleeve engaging and also limiting the available axial movement of said first clutch part.

In use the main spring(s) provide the clamp force in the brakes-on condition. To release the brake, hydraulic pressure is applied to said hollow piston so that said hollow piston compresses the main spring and progressively reduces the clamp force until the friction pad is clear of the braking disc. At the same time the hydraulic pressure displaces said second piston against a further spring and interengages said first and second cone clutch parts. The spiral thread on which said first cone clutch part is mounted then tries to rotate the cone clutch parts. However, with new or adjusted pads the clamp force prevents such rotation and before the clamp force has reduced to a level when the clutch parts can rotate e.g. the pad has lifted off the brake disc, said first cone clutch part has engaged said stop means to thus disengage the clutch and prevent any adjustment. If, however, sufficient pad wear has occurred, the pad will be lifted off the braking disc before the clutch is disengaged so that the spiral thread on the axial extension of the second piston will rotate the clutch and thus said one adjuster member via said gear. This adjustment will continue as the hollow piston moves to release the brake, until the said first cone clutch part engages said stop means, at which time the clutch will be disengaged and adjustment will cease.

The present invention will now be further described, by way of example, with reference to the accompanying drawing, in which a schematic cross-sectional view of a preferred embodiment of the present invention is shown.

The brake actuator illustrated in the accompanying drawing comprises two elongate adjuster members 1,3 which are interconnected by a self-sustaining thread 5 and guided in an actuator housing 7. One adjuster member is in the form of a threaded shaft 1, the other being a hollow thimble 3 which is non-rotatably secured to a spreader plate 9; the spreader plate 9 engaging friction pad 11. Said one adjuster member 1 is connected by an articulated joint 13 and a coaxial gear wheel 15, to an actuator member 17 against which a number of main springs 19 press, said main springs 19 being reacted against the actuator housing 7. The friction pad 11 and the opposed friction pad (not shown) in a reaction caliper, are thus applied to a braking disc by the action of said main springs 19.

Located in the actuator housing 7 around said adjuster members 1,3 are a number of bores 21, within each of which a hollow piston 23 is axially displaceable by hydraulic fluid pressure. Each hollow piston 23 is engaged with said actuator member 17 such that the introduction of hydraulic fluid pressure into bores 21 compresses the main springs 19 and thus progressively reduces the clamp force on the friction pads. This progressive relaxation of the caliper deflection also reduces the load in the adjuster and eventually lifts the friction pads clear of the braking disc. This action stops when actuator member 17 engages stop 25 on the actuator housing 7.

Carried within each hollow piston 23 is a second piston 27 which is axially displaceable against a spring 29, spring 29 engaging against a shoulder member 31 fixed within the bore 33 in said hollow piston 23. Said shoulder member 31 has a central splined aperture through which an axial extension 35 of said second piston 27 extends. Said axial extension 35 is likewise axially splined so that the extension 35 and second piston can move axially but cannot rotate. The axial extension 35 also carries a spiral thread 37 which cuts across said axial splines and complimentarily engages with a first part 39 of a cone clutch 39,41. To limit the available movement of said first clutch part 39 along said axial extension 35 a stop in the form of a stud 43 projects laterally from the end region of the axial extension 35 between adjacent threads. A further stop in the form of a cylindrical sleeve 45 is mounted coaxially with respect to said axial extension 35, so that as the brake is released the axial extension 35 moves along the inside of the sleeve 45, the sleeve 45 eventually engaging and preventing further axial movement of said first clutch part 39.

Said second clutch part 41 is generally annular and located over said first clutch part 39, said clutch parts being biassed towards engagement with each other by a spring 47 which is engaged between a circlip 49 on said first clutch part 39 and a washer 51 and anti-friction bearing 53, said anti-friction bearing 53 engaging said second clutch part 41. Teeth 55 are provided on the periphery of said second clutch part 41 and these teeth 55 mesh with a gear 57 which in turn meshes with the gear 15 coaxially connected with said one adjuster member 1. A spring biassed ball 59 engages the gear 15 to prevent accidental rotation, e.g. adjustment, as could possibly happen due to vibration in the brake released condition.

The accompanying drawing shows the fully adjusted state with zero hydraulic pressure in the cylinder bores 21. The friction pads are thus taking the full clamp force of the main springs 19 acting through the assembly 17, 15, 13, 1, 3, 9. This could be called the 'parked, brake-on, position'. At this point a clearance 61 exists between the base of bore 21 and the hollow piston 23 to allow some reserve stroke for the hollow piston 23. Also, the second piston 27 is pressed by the spring 29 against its limit position in the bore within said hollow piston 23, said limit position being defined by the first clutch part 39 which is engaged between the stud 43 and the fixed shoulder member 31.

As the hydraulic pressure is increased in bores 21, the hollow pistons 23 press against the actuator member 17 and the main springs 19. Also the hydraulic pressure acts via small aperture 63, in the hollow pistons 23 to try to displace said second pistons 27. As the loads on the pistons 23,27 increase they will perform their functions independently. Hollow pistons 23 will progressively compress the main springs 19 moving the whole assembly to the right as illustrated, relative to the actuator housing 7. Second pistons 27 will also move to the right as illustrated, relative to said hollow pistons 23, compressing springs 29 and allowing spring 47 to engage the clutch 39,41. From now on the second pistons 27 will be reacted by the washer 51 and the clutch parts 39,41 will be frozen together. The spiral thread angle and the angle of the clutch faces are so chosen that the clutch does not slip, the torque generated by the spiral thread being transmitted to the adjuster members 1,3 by the gears 57 and 15. The adjuster cannot, however, move at this time, due to the large clamp force produced by the main springs 19. Eventually the said one clutch part 39 engages the sleeve 45 and the whole assembly continues to move to the right, as illustrated, except for said first clutch part 39 and said sleeve 45. The clutch 39,41 is thus disengaged allowing said one clutch part 39 to rotate freely on the axial extension 35. At this point the second pistons 27 move to their maximum right-hand positions as illustrated, limited solely by the shoulder member 31. No adjustment is therefore effected when the friction pads subsequently lift off the braking disc.

If the brake had required adjustment, the adjuster members 1,3 would have been unloaded by the hollow pistons 23 earlier in the piston stroke and before the clutch 39,41 was disengaged. The spiral thread torque would then have been transmitted through the gears 57 and 15 to effect the adjustment until either the second pistons 27 reached their limit position or the clutch had been disengaged by said sleeve 45.

In either of the above cases the brake is eventually in its fully 'off' position. To reapply the brake the hydraulic pressure in bores 21 is reduced. As the hydraulic load on said second pistons 27 will be large compared to the force of springs 29, said second pistons 27 will remain against said shoulder member 31 for most of the return operation, i.e., they will not move relative to said hollow pistons 23. Said hollow pistons 23 and the rest of the system will move back to the left, as illustrated, under the action of main springs 19, first taking up the pad clearance and then applying the clamp force. Eventually springs 29 will overcome the fluid pressure and move said second pistons 27 to the left in the accompanying drawing, relative to said hollow pistons 23. The adjuster parts 1,3 will however, be frozen by the clamp force and said second clutch part 41 will not be allowed to rotate. The thrust on the spiral thread (to the left in the accompanying drawing) will disengage the clutch 39, 41 against the spring 47, allowing the first clutch part 39 to spin back until engaged by the stud 43. The system is now back in said 'parked position'.

It is to be noted that the clutch 39,41 is disengaged completely when the actuator is in both the brakes 'off' and the 'parked' position. To change the friction pads the following simple procedure is required:

1. In the brakes 'off' position, wind back the hollow thimble 3 to its maximum extent and remove the worn pads. This can be effected manually.

2. Release hydraulic pressure to the 'parked position'.

3. Fit the new pads and manually wind up the adjuster as far as possible—applying a clamp load manually.

4. Apply hydraulic pressure to move the actuator to the brakes 'off' position. This will produce an unusually large adjustment of almost the full stroke of said second piston 27 giving a good working clearance.

5. Subsequent brake operations will finely adjust the clearance to the target value as determined by the axial position of sleeve 45 in the actuator housing 7.

As previously mentioned the hydraulic pressure in each said second piston 27 is controlled via aperture 63. If this relatively small aperture 63 were not provided then the unrestricted movement of the second piston 27 would be very rapid and an uncontrolled 'gulp' of fluid would be drawn from the servo power source. This would be likely to cause a pressure transient which might effect the clamp force. By providing this aperture 63 the rate of movement of the second piston 27 is limited, thus smoothing out the demand on the power source.

The spiral thread 37 superimposed over the axially extending splines on the axial extension 35 is a preferred arrangement since it is a direct method of reacting the thread torque. In the illustrated embodiment there is a peg or similar means (not shown), which reacts the torque between the hollow pistons 23 and the actuator member 17. As an alternative, the axial splines on the axial extension 35 may engage a complimentary shape in the bore of sleeve 45. It is to be noted that the second pistons 27 and their respective axial extensions 35 may have the thread torque reacted by any other means so that the construction is not dependent on having a superimposed thread 37 and axial splines.

Whilst the above described embodiment utilises a clutch 39,41, this may be replaced by a pawl and ratchet assembly (not shown). If a pawl and ratchet assembly is substituted then the following parameters must be met:

1. The teeth must be rounded and sufficiently robust to withstand disengagement under load.

2. Movement of the second piston 27 to the right in the accompanying drawing, must be taken on a square shoulder formed between components 39 and 41, and the ratchet teeth must be protected and be subjected solely to spring load. Even if the ratchet teeth were robust enough to take the load direct, the lack of consistency in the axial position of component 39 due to the random contact of an annular ratchet of rigid teeth would ruin the resolution of the adjuster position as determined by sleeve 45.

3. The ratchet must be out of engagement in the fully 'off' and 'parked' positions of the actuator.

The present invention thus provides a brake actuator with a mechanically operated adjuster, thus providing for reliable and efficient automatic brake adjustment over a long period of time.

I claim:

1. A brake actuator comprising two adjuster members interconnected by a self-sustaining thread and located between a friction pad, and an actuation member having at all times operative engagement with said friction pad through said two adjuster members and said self-sustaining thread, the actuation member being biassed by a main spring to a brakes-on position with at least one hollow piston being displaceable under hydraulic pressure to compress the main spring and move the actuation member to a brakes-off position, said at least one hollow piston being at all times in direct engagement with said actuation member, a second piston being carried within said hollow piston so as to be movable therewith and also being axially displaceable within said hollow piston under said hydraulic pressure and against a further spring, to cause interengaging means to at least try to rotate one adjuster member relative to the other adjuster member, stop means being arranged to limit the actual movement of said interengaging means.

2. A brake actuator according to claim 1, wherein a restrictor orifice allows hydraulic fluid to pass into and out of the hollow piston to thereby control said second piston.

3. A brake actuator according to claim 1, wherein the interengaging means comprises a cone clutch, a first part of which is mounted on a spiral thread on an elongate axial extension of said second piston, and a second part of which is spring mounted coaxially with said axial extension and meshed with a gear which can rotate said one adJuster member.

4. A brake actuator according to claim 1, wherein said second piston is non-rotatable within said hollow piston.

5. A brake actuator according to claim 3, wherein said stop means comprises a stud projecting laterally from said axial extension and thus limiting the available rotation for said first part of the cone clutch on said spiral thread.

6. A brake actuator according to claim 5, wherein said stop means additionally includes a sleeve coaxially mounted with said axial extension so that said axial extension can move coaxially within said sleeve as the brake is released, said sleeve being engageable with said first part of the cone clutch to thus also limit the available axial movement for said first part of the cone clutch.

* * * * *